United States Patent Office 3,035,024
Patented May 15, 1962

3,035,024
SULFONE POLYESTERS
Donald M. Young, Geneva, Switzerland, Christian F. Horn, New York, N.Y., and Fritz Hostettler, Charleston, W. Va., assignors to Union Carbide Corporation, a corporation of New York
No Drawing. Filed Oct. 7, 1957, Ser. No. 688,411
19 Claims. (Cl. 260—75)

This invention relates to novel polyesters that are useful as plasticizers, resin modifiers and in the preparation of shaped articles such as filaments, films, coatings and molded products, as well as to a method for their preparation.

In accordance with the invention, it has been found that polyesters having recurring structural units of the general formula

I. —OR′OOCRSO$_2$RCO— wherein the R's are polymethylene chains and the R″'s are divalent alkylene, alkylene ether or aralkylene radicals containing from two to ten carbon atoms can be prepared by reaction of alpha,omega diols containing from two to ten carbon atoms with dialkylene monosulfones of the general formula

II. SO$_2$[RCOOX]$_2$ in which the R's are as defined in Formula I and the X's are H or lower alkyl radicals capable of forming alcohols having boiling points below about 200° C. under the conditions of operation.

The polyesters of the invention have a considerable number of important uses and advantages. In liquid or semi-solid low molecular weight form, they are useful as plasticizers, particularly for vinyl resins, and as intermediates for reaction with isocyanates in the preparation of polyurethane elastomers and foams. They may also be block copolymerized with polyethylene terephthalates to improve the dyeability thereof, plasticize the relatively stiff fiber, and increase the moisture regain. In addition, higher molecular weight solid polyesters having reduced viscosities within the range of about 0.3 to about 1.5 are useful per se as molding resins, fibers, films, wire coating and insulating materials, and the like.

The dialkylene monosulfones that are particularly suitable as starting materials in accordance with the method of the invention are those identified in Formula II in which the X's are methyl groups and in which the R's are unsubstituted polymethylene chains, such compounds as dimethyl 4,4′-sulfonyl dibutyrate, dimethyl 5,5′-sulfonyldivalerate, and dimethyl 6,6′-sulfonyldicaproate being preferred. Also included among the dialkylene monosulfones that are particularly suitable as starting materials are the corresponding sulfonyl-dibutyric, -divaleric and -dicaproic acids.

The alpha,omega diols that are suitable as starting materials in accordance with the invention include, as indicated in the definition of R′ in Formula I, dihydroxy compounds of the general formula

III. R′(OH)$_2$ in which R′ is a divalent saturated alkylene, alkylene ether or aralkylene radical containing from two to ten carbon atoms. These include alpha,omega polymethylene glycols of the formula HO(CH$_2$)$_n$OH in which $n$ is an integer from 2 to 10, branched chain and alkylene ether alpha,omega glycols such as 3-methyl-1,5-pentanediol and dipropylene glycol, and symmetrical aralkylene diols such as para-xylylene glycol.

The reaction of the primary starting materials in forming substantially linear polyesters having molecular weights ranging between about 1000 and 60,000 is believed to take place in essentially two stages, an ester exchange reaction and a polycondensation. While there is reason to believe that these stages are not necessarily separate and distinct and that they may at least in part take place simultaneously, the mechanism of the reactions is set forth to facilitate ready comprehension of the factors that are involved:

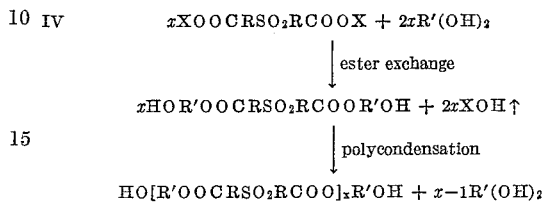

The subscript $x$ may vary from about 5 to about 200.

It will be evident that the ester exchange reaction involves substantially complete elimination of the X alkyl radicals in the form of the corresponding alcohol and that the polycondensation involves the elimination of excess glycol. It follows that for most effective preparation of the linear polymers, the alkyl radicals X should be lower alkyl, preferably methyl, radicals so that the resulting alcohol will have a relatively low boiling point, or at least a lower boiling point than the excess glycol eliminated in the second stage. It is also apparent that the boiling point of the glycol used as initial reactant is at least partially determinative of the conditions for polycondensation and removal of excess glycol. If a relatively low boiling glycol, e.g., ethylene glycol, is used, it can be used in considerable excess because a substantial amount can be distilled without in the least degrading the polymer through thermal decomposition. If, however, a higher boiling glycol such as 1,10-decanediol is used, it is desirable to use a smaller excess.

The initial reactants are admixed, preferably with a catalyst, and subjected to conditions producing ester interchange until the ester interchange is substantially complete. These conditions involve heating the reactants to a temperature sufficiently high to bring about the reaction and to eliminate the alcohol formed thereby. Depending upon the glycols used, temperatures of the order of about 150 to 250° C. are ordinarily sufficient to initiate and complete the ester interchange. For polycondensation and elimination of the glycol, the temperature employed is above the melting point of the polymer and below the temperature at which the polymer becomes thermally unstable. If the boiling point of the glycol to be eliminated is substantially higher than this temperature, the polycondensation can be carried out under reduced pressure so as to assure complete removal of excess glycol from the melt. Polycondensation temperatures within the range of 180 to 285° C. and preferably between about 210 and 280° C. lead to uniformly good results although departures from these temperatures, i.e., as high as 300° C., may be permissible if some discoloration and degradation is not considered unduly detrimental.

The reactions may be carried out under an inert atmosphere such as nitrogen at atmospheric, reduced, or super-atomspheric pressure. In the preferred embodiment of the method of the invention, a stream of nitrogen is passed through the melt so as to provide an inert atmosphere and at the same time agitate the reactants to assist in removing the alcohol or glycol distilled from the reaction mixture. When glycols are used that boil at temperatures too high for easy elimination at atmospheric pressure and at temperatures unduly close to or above the temperature of thermal degradation of the monomers or polymers, it is desirable to sweep excess glycols out of the melt with an inert gas such as nitrogen, or to operate under reduced pressure as indicated earlier, or to use a combination of these measures.

The reaction may also be carried out by means of the solution polymerization technique that involves dissolving the starting materials in an inert solvent such as a paraffin oil or other high boiling aliphatic or aromatic hydrocarbon containing no reactive groups, followed by heating at elevated temperatures under a nitrogen atmosphere until the desired degree of polymerization has been reached or the molecular weight of the product is high enough to precipitate from the hot solution.

The time of reaction is dependent upon the reaction rate and the desired molecular weight or reduced viscosity of the ultimate polycondensate. If a liquid product suitable as a plasticizer, e.g., one having a molecular weight as low as about 2500, is desired, the polycondensation conditions should generally be relatively mild. If, on the other hand, higher molecular weight polycondensates suitable for forming shaped products are desired, the time and conditions of polycondensation should be made more severe.

In starting with a glycol and a dialkylene mono-sulfone, ester interchange catalysts are preferably used. These include such well known catalysts as metallic lithium, sodium, calcium, magnesium, zinc, cadmium, aluminum, manganese, cobalt, silver, tin, lead and antimony. These metals may be added to the initial mixture of sulfone and glycol in powder form or in the form of their alcoholates, oxides and salts with weak inorganic and organic acids. Titanium alkoxides and organo-tin compounds are particularly efficient polycondensation catalysts. If the sulfone diacids are used, it is preferable to employ either no catalyst or small amounts of catalysts such as para-toluenesulfonic acid, zinc chloride, or the like, for the esterification reaction.

The amount of catalyst used is within the range of about 0.005 to about 0.5 and preferably between about 0.01 and 0.15% based on the total amount of dialkylene monosulfone that is used. Departures from these ranges are permissible. However, the use of more than about 0.5% can result in discoloration of the ultimate polymer and amounts less than about 0.005 may reduce the rate of reaction to an extent that would not be practicable for commercial operation.

The molar proportion of glycol used for reaction with the sulfone must, as indicated in Equation IV, at least equal the molar amount of sulfone and should preferably be at least twice that amount. When a readily removable glycol such as ethylene glycol is used, there is some advantage in using a higher proportion of glycol, e.g., up to about ten mols per mol of sulfone, inasmuch as the glycol will tend to act as a solvent for the catalyst and the excess will assure complete ester exchange. With higher boiling alcohols, however, it is advantageous to use less excess glycol.

It is to be understood, of course, that mixtures of monosulfones and mixtures of diols may be employed in order to form copolymers in which different sulfone and glycol residues are present in ordered or random distribution. The polymers so produced are generally somewhat less crystalline, lower melting and softer than those of equivalent molecular weight and reduced viscosity obtained by using a specific sulfone and a specific glycol, as are the homopolymers in which the R's are branched alkylene or alkylene ether radicals.

It is also within the scope of the invention, as will readily be appreciated by those skilled in the art, to start with the saturated glycolic diesters of the monosulfones and simply subject them to homopolymerization or to start with two or more such glycolic diesters and subject them to copolymerization, thus avoiding the initial ester interchange reaction of sulfone with glycol.

The method, the products and the utility and advantages thereof will become further apparent from the following detailed examples included to illustrate the best modes now contemplated of practicing the invention. In these examples the parts are by weight and the reduced viscosity, used as a measure of the degree of polymerization, is defined by Equation V:

$$I_R = \frac{\left(\frac{\Delta N}{N_0}\right)}{C}$$

in which $\Delta N$ is the difference between flow time of solution and flow time of solvent, $N_0$ stands for flow time of solvent and $C$ is the concentration of the polymer in grams per 100 cc. of solution. Unless otherwise specified, reduced viscosity values were obtained at 47° C., the solvent was a 3:2 mixture of phenol and tetrachloroethane, and the concentration of the polymer in the solution was 0.2 gram/100 cc. For forming shaped articles, reduced viscosities within the range of about 0.3 to about 1.5 are operable and viscosities within the range of about 0.3 to 1.2 are especially suitable for spinning fibers useful in textiles, lower viscosities being desirable for plasticizer utility.

*Example 1*

Dimethyl 6,6'-sulfonyldicaproate (5 parts), ethylene glycol (5 parts) and tetraisopropyl titanate (0.005 part) were charged into a test-tube having a side-arm. The initial ester exchange reaction and the distillation of methanol were conducted at 160 to 190° C. over a period of 1.75 hours in nitrogen atmosphere. The temperature was then increased slowly to 230° C. in order to remove the excess ethylene glycol. A vacuum of 3 mm. Hg was then applied and the temperature was increased to 275° C. The polycondensation was performed under these conditions over a period of 3.5 hours.

The resulting yellowish polymer was partly crystalline and melted at 80° C. Its reduced viscosity was 0.96. The material can be used as wire-coating, electrical insulator, etc.

*Example 2*

Dimethyl 6,6'-sulfonyldicaproate (100 parts), ethylene glycol (80 parts), calcium (0.05 part) and lead benzoate (0.05 part) were charged into a condensation vessel equipped at the bottom for introduction of finely dispersed nitrogen. The initial ester exchange reaction was carried out over a period of two hours at 185° C. with continuous removal of methanol in a slow nitrogen stream. After finishing the methanol distillation, the temperature was raised to 220° C. in order to distill over the excess of ethylene glycol. The nitrogen flow rate was then increased to 1.5 liters per minute and the melt was heated to 220° C. for about four hours. After this time the polycondensation reaction was completed and a white fiber-forming resin was obtained.

The reduced viscosity of this resin was 0.93 and its melting point was 95 to 98° C. The resin is an excellent wire-coating material and electrical insulator.

*Example 3*

Dimethyl 6,6'-sulfonyldicaproate (100 parts), 1,4-butanediol (80 parts), calcium methoxide (0.09 part) and zinc borate (0.05 part) were charged to a condensation vessel and treated in a manner similar to that of Example 2. After the initial ester exchange at 160 to 210° C., the temperature was maintained at 205 to 210° C. for eight hours to perform the polycondensation reaction.

A white, fiber-forming resin, melting at 100 to 106° C. and having a reduced viscosity of 1.04, was obtained. The resin is suitable as a molding and film-forming material.

*Example 4*

Dimethyl 6,6'-sulfonyldicaproate (100 parts), 1,5-pentanediol (100 parts), and calcium oxide (0.1 part) were charged to the reaction vessel and treated in a manner similar to that of Example 2. After the ester interchange was complete, the melt was heated for eighteen hours at 240 to 275° C. while passing a vigorous nitrogen stream through the melt.

The reduced viscosity of the resin was 0.69 and its melting point was 89 to 92° C. The polymer was white in color and showed good fiber-forming and foil-forming properties, indicating utility in wire coating and molding applications.

*Example 5*

The general procedure of Example 2 was repeated execpt that 120 parts of 1,6-hexanediol and 0.1 part of calcium oxide were used instead of the ethylene glycol, calcium, and lead benzoate. After termination of the ester exchange, the temperature was gradually increased to 260 to 280° C. The condensation was then performed at this temperature over a period of eighteen hours.

The resulting resin melted at 88 to 90° C., had a reduced viscosity of 0.69 and was light ivory in color. The polymer was fiber- and foil-forming and had demonstrated utility in wire coating and electrical insulation applications.

*Example 6*

The procedure of Example 2 was repeated except that stoichiometric amounts of dimethyl 6,6'-sulfonyldicaproate (100 parts) and para-xylylene glycol (42 parts) were employed in the reaction. Calcium (0.15 part) and sodium (0.08 part), dissolved in ethylene glycol (20 parts), and tetraphenyltin (0.02 part) were added as catalysts. After the initial ester exchange was completed, the condensation was conducted at 200 to 210° C. over a period of twelve hours under a nitrogen atmosphere.

The resin obtained was light ivory in color and had a reduced viscosity of 0.75, its melting point was 109 to 111° C. The polyester has utility in wire coating, film, molding resin and electrical insulation applications.

*Example 7*

The general procedure of Example 1 was repeated, except that dimethyl 6,6'-sulfonyldicaproate (25 parts), dipropylene glycol (150 parts), calcium (0.01 part) and zinc borate (0.01 part) were employed in the condensation. After the ester exchange, the polycondensation was performed at 180° C. under reduced pressure (3 mm. Hg) for 1.4 hours. The resulting resin was a highly viscous liquid, of light yellow color; its reduced viscosity was 0.21; its molecular weight was 2360.

The polycondensate, identified as polycondensate A, was evaluated as a plasticizer in "Vinylite" VYNW, a copolymer containing 97% vinyl chloride and 3% vinyl acetate, and compared with a plasticizer of the formula

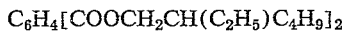

identified as plasticizer B. Plasticizer B is considered one of the best plasticizers on the market for the vinyl resin in question. The test data is shown in the table immediately below:

| Plasticizer | A | B |
| --- | --- | --- |
| Percent by weight in resin copolymer | 69 | 40 |
| Tensile strength, p.s.i. at 24.5° C | 2,790 | 3,450 |
| Elongation, Percent at 24.5° C | 250 | 285 |
| Load at 100% elongation, p.s.i. at 24.5° C | 2,150 | 2,150 |
| Percent oil extraction after 10 days at 25° C | 0.1 | 4.0 |
| SPI volatile loss, Percent in 24 hours at 70° C | 0.3 | 3.0 |

The data in the foregoing table indicate that in compositions of equal flexibility, i.e., having a modulus of 2150 p.s.i. at 100% elongation, the polycondensate of the invention is markedly superior over the commercial plasticizer with regard to volatility and resistance to oil extraction. This superiority permits use of the polycondensate as plasticizer in high temperature applications and in instances where high resistance to oil extraction is required.

*Example 8*

The general procedure of Example 2 was repeated except that sulfonyldicaproic acid (100 parts) and ethylene glycol (66 parts) were used in the condensation reaction. The esterification reaction was performed at 180 to 185° C. over a period of six hours. The polycondensation was then carried out at 210° C. for 1.5 hours.

The resulting polymer was a highly viscous liquid at room temperature. Its reduced viscosity was 0.22. This polycondensate is useful as a plasticizer for vinyl-type resins.

*Example 9*

The general procedure of Example 2 was repeated except that 6,6'-sulfonyldicaproic acid (100 parts), ethylene glycol (66 parts) and para-toluenesulfonic acid (0.03 part) as esterification catalyst were charged to the condensation vessel. After six hours of esterification reaction at 185° C., the temperature was raised to 220° C. for eight hours to conduct the polycondensation.

The resulting polymer was a film-forming resin. It had a melting point of 70 to 73° C. and a reduced viscosity of 0.88.

*Example 10*

The general procedure of Example 2 was repeated except that dimethyl 5,5'-sulfonyldivalerate (100 parts), ethylene glycol (90 parts) and calcium (0.08 part) were used in the condensation reaction. When the initial ester exchange was completed, the temperature was raised to 250 to 260° C. and the polycondensation was conducted for about three hours.

The resulting resin had a reduced viscosity of 0.45 and was suitable as a wire coating material. Its melting point was 89 to 91° C.

*Example 11*

Example 2 was repeated except that dimethyl 4,4'-sulyfonyldibutyrate (100 parts) and 1,6-hexanediol (100 parts) were employed. The ester exchange catalyst was calcium (0.08 part). After the ester exchange was finished the temperature of the reaction mixture was increased to 260° C. and the polycondensation was carried out for 3.3 hours.

The resin obtained had film- and fiber-forming properties. Its melting point was 91 to 94° C. and its reduced viscosity was 0.79.

*Example 12*

Dimethyl 4,4'-sulfonyldibutyrate (10 parts), 1,10-decanediol (10 parts), magnesium acetate (0.012 part) and tetraisopropyl titanate (0.005 part) were charged into a condensation vessel equipped at the bottom for introduction of finely dispersed nitrogen. An initial ester exchange reaction was carried out over a period of one hour at a temperature of 180° C. with continuous removal of methanol in a slow nitrogen stream. After completion of the methanol distillation, the temperature was raised to 220° C. for removal of excess glycol over a period of 1.7 hours using 3.3 liters/min. nitrogen. Final polymerization was accomplished at 230° C. over a period of 6.5 hours while passing a stream of 3.3 liters/min. nitrogen through the melt.

The polymer obtained was glass-clear. It had a reduced viscosity of 1.17 and a softening range of 104 to 139° C.

*Example 13*

The general procedure of Example 12 was repeated except that 10 parts 1,3-propanediol were used in place of the decanediol. The ester exchange was carried out over a period of 1.1 hours at 180° C. using a stream of 0.1 liter/min. nitrogen, the glycol distillation was carried out over a period of three hours at 200° C. using a stream of 0.4 liter/min. nitrogen, and the polycondensation was carried out over a period of seven hours at 200° C. using a stream of 1.9 liters/min. nitrogen.

7

The polymer obtained was white, had a reduced viscosity of 1.03 and melted at 117° C. It was extrudable into film and fibers and siutable as a wire coating material.

*Example 14*

The procedure of Example 12 was repeated except that 10 parts dimethyl 5,5'-sulfonyldivalerate and 10 parts 1,3-propanediol were used instead of the dibutyrate and decanediol, respectively. Ester exchange was effected over a period of 0.7 hour at 180° C. using a stream of 0.1 liter/min. nitrogen, glycol distillation was carried out over a period of one hours at 210° C. using 0.6 to 1.6 liters/min. nitrogen, and the final polymerization was accomplished over a period of five hours at 210° C. using 2.8 to 3.3 liters/min. nitrogen.

The polymer obtained had a reduced viscosity of 0.8 and melted at 113° C. It had excellent film-forming and wire coating properties.

*Example 15*

The procedure of Example 14 was repeated with 10 parts 1,4-butanediol in place of the propanediol. Ester exchange was effected over a period of 0.6 hour at 190° C. using a stream of 0.1 liter/min. nitrogen, glycol distillation was effected oved a period of 0.4 hour at 220° C. using 1.5 liters/min. nitrogen, and final polymerization was accomplished over a period of 3.7 hours at 225° C. using 3.1 liters/min. nitrogen.

The polymer obtained melted at 108 to 110° C. and had a reduced viscosity of 1.35. The polymer was useful in wire coating and film-forming applications and as a molding resin.

*Example 16*

The general procedure of Example 12 was repeated with 10 parts dimethyl 6,6'-sulfonyldicaproate and 10 parts 1,5-pentanediol in place of the dibutyrate and decanediol, respectively. Ester exchange was accomplished over a period of 0.5 hours at 185° C. using 0.1 liter/min. nitrogen, glycol distillation was effected over a period of 0.7 hour at 210° C. using a stream of 1.5 liters/min. nitrogen, and final polymerization was accomplished over a period of three hours at 210° C. using 3.1 liters/min. nitrogen.

The polymer melted at 101° C. and had a reduced viscosity of 1.36. It was useful in molding applications and in wire coating.

*Example 17*

The procedure of Example 16 was repeated except that 10 parts 1,6-hexanediol was used in place of the pentanediol. Ester exchange was effected over a period of 0.6 hour at 185° C. using 0.1 liter/min. nitrogen, glycol distillation was effected for a period of 1.7 hours at 210° C. using a stream of 1.5 liters/min. nitrogen, and final polymerization was accomplished over a period of 5.5 hours at 210° C. using a stream of 3.1 liters/min. nitrogen.

The polymer obtained was fiber-forming and cold-drawing and useful as a wire coating material. It had a melting point at 97° C. and a reduced viscosity of 1.34.

*Example 18*

The procedure of Example 16 was repeated with 10 parts 1,10-decanediol in place of the pentanediol. Ester exchange was effected in one hour at 200° C. using a stream of 0.1 liter/min. nitrogen, glycol distillation was effected over a period of 1.7 hours at 220° C. using 1.5 liters/min. nitrogen, and final polymerization was accomplished over a period of 6.5 hours at 230° C. using a stream of 3.1 liters/min. nitrogen.

The polymer obtained had excellent film-forming properties and was useful as a wire coating resin. It had a reduced viscosity of 1.48 and began to soften at 88° C.

8

*Example 19*

Dimethyl 6,6'-sulfonyldicaproate (200 parts), 3-methylpentamethylene glycol (236 parts) and calcium (0.4 part dissolved in 20 parts ethylene glycol) were charged to a one-liter, four-neck flask equipped with a reflux condenser, agitator, thermometer and gas inlet tube. The mixture was heated for 0.5 hour at 220° C. under reflux. The reflux condenser was then replaced by a distillation head and methanol was removed. The temperature was lowered to 190° C. which was maintained for one hour while glycol was removed under reduced pressure (2 mm. Hg) and a nitrogen atmosphere.

The product obtained was a white, wax-like solid melting at 51 to 52° C. It had a molecular weight of 2245, measured by hydroxyl group determination.

The polymer was found to be an excellent plasticizer for polyvinyl chloride resins and the oil resistance and volatility of such resins plasticized therewith showed considerable improvement over polyvinyl chloride resins plasticized with two of the best known commercially available plasticizers.

It is to be expected that numerous modifications will readily become apparent to those skilled in the art upon reading this description. All such modifications are intended to be included within the scope of the invention as defined in the appended claims.

We claim:

1. A linear polyester having a molecular weight ranging between about 1000 and 60,000 and consisting essentially of repeating structural units of the general formula

—OR'OOCRSO$_2$RCO— wherein the R's stand for polymethylene chains having three to five carbon atoms and R' stands for a member selected from the group consisting of divalent alkylene, alkylene ether and aralkylene radicals of alpha,omega diols containing from two to ten carbon atoms.

2. A fiber-forming linear polymer consisting essentially of repeating structural units of the general formula

—OR'OOCRSO$_2$RCO— wherein the R's stand for polymethylene chains having three to five carbon atoms and R' stands for a member selected from the group consisting of divalent alkylene, alkylene ether and aralkylene radicals of alpha,omega diols containing from two to ten carbon atoms.

3. Method of preparing of a linear polyester which comprises heating a mixture consisting essentially of a dialkylene sulfone of the general formula

SO$_2$[RCOOX]$_2$ wherein the R's stand for polymethylene chains having three to five carbon atoms and the X's are members of the group consisting of hydrogen and lower alkyl radicals of alcohols having boiling points below about 200° C. with an alpha,omega diol of the general formula

R'(OH)$_2$ wherein R' stands for a member selected from the group consisting of divalent saturated alkylene, alkylene ether and aralkylene radicals containing from two to ten carbon atoms to a temperature up to about 300° C. to obtain a fiber-forming melt.

4. Method of preparing a linear polyester which comprises heating a mixture consisting essentially of a dialkylene sulfone of the general formula

SO$_2$[RCOOX]$_2$ wherein the R's stand for polymethylene chains having three to five carbon atoms and the X's are members of the group consisting of hydrogen and lower alkyl radicals of alcohols having boiling points below about 200° C. with an alpha,omega diol of the general formula

R'(OH)$_2$ wherein R' stands for a member selected from the group consisting of divalent saturated alkylene, alkylene ether and aralkylene radicals containing from two to ten carbon atoms to a temperature of the order of about 150 to 250° C. to effect ester interchange and heating the reaction mixture to a temperature within the range of about 180 to 285° C. to obtain a fiber-forming melt.

5. Method of preparing a linear polyester which comprises heating a mixture consisting essentially of a dialkylene sulfone having the general formula $$SO_2[RCOOX]_2$$

wherein the R's stand for polymethylene chains having three to five carbon atoms and the X's are members of the group consisting of hydrogen and lower alkyl radicals of alcohols having boiling points below about 200° C. with an alpha,omega diol of the general formula $$R'(OH)_2$$

wherein R' stands for a member selected from the group consisting of divalent saturated alkylene, alkylene ether and aralkylene radicals containing from two to ten carbon atoms to a temperature of the order of about 150 to 250° C. for esterification, heating the reaction mixture to a temperature within the range of about 180 to 285° C. to obtain a fiber-forming melt and melt-spinning the resulting resin into filament form.

6. A fiber-forming linear polymer consisting essentially of repeating structural units of the formula $$—O(CH_2)_2OOC(CH_2)_5SO_2(CH_2)_5CO—$$

7. A fiber-forming linear polymer consisting essentially of repeating structural units of the formula $$—O(CH_2)_4OOC(CH_2)_5SO_2(CH_2)_5CO—$$

8. A fiber-forming linear polymer consisting essentially of repeating structural units of the formula $$—O(CH_2)_5OOC(CH_2)_5SO_2(CH_2)_5CO—$$

9. A fiber-forming linear polymer consisting essentially of repeating structural units of the formula $$—O(CH_2)_6OOC(CH_2)_5SO_2(CH_2)_5CO—$$

10. A fiber-forming linear polymer consisting essentially of repeating structural units of the formula

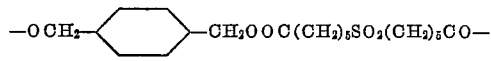

11. A fiber-forming linear polymer consisting essentially of repeating structural units of the formula $$—OC_3H_6OC_3H_6OOC(CH_2)_5SO_2(CH_2)_5CO—$$

12. A fiber-forming linear polymer consisting essentially of repeating structural units of the formula $$—O(CH_2)_2OOC(CH_2)_4SO_2(CH_2)_4CO—$$

13. A fiber-forming linear polymer consisting essentially of repeating structural units of the formula $$—O(CH_2)_6OOC(CH_2)_3SO_2(CH_2)_3CO—$$

14. A fiber-forming linear polymer consisting essentially of repeating structural units of the formula $$—O(CH_2)_{10}OOC(CH_2)_3SO_2(CH_2)_3CO—$$

15. A fiber-forming linear polymer consisting essentially of repeating structural units of the formula $$—O(CH_2)_3OOC(CH_2)_3SO_2(CH_2)_3CO—$$

16. A fiber-forming linear polymer consisting essentially of repeating structural units of the formula $$—O(CH_2)_3OOC(CH_2)_4SO_2(CH_2)_4CO—$$

17. A fiber-forming linear polymer consisting essentially of repeating structural units of the formula $$—O(CH_2)_4OOC(CH_2)_4SO_2(CH_2)_4CO—$$

18. A fiber-forming linear polymer consisting essentially of repeating structural units of the formula $$—O(CH_2)_{10}OOC(CH_2)_5SO_2(CH_2)_5CO—$$

19. A fiber-forming linear polymer consisting essentially of repeating structural units of the formula

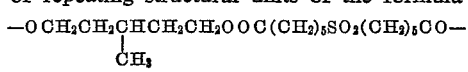

References Cited in the file of this patent

UNITED STATES PATENTS

| | | |
|---|---|---|
| 2,427,640 | Whitehill et al. | Sept. 16, 1947 |
| 2,614,120 | Caldwell | Oct. 14, 1952 |
| 2,689,864 | Emerson et al. | Sept. 21, 1954 |
| 2,720,502 | Caldwell | Oct. 11, 1955 |

FOREIGN PATENTS

| | | |
|---|---|---|
| 402,799 | Italy | Mar. 24, 1943 |